DUAL POINT ANNUNCIATOR SYSTEM

Filed June 26, 1967 4 Sheets-Sheet 1

INVENTOR
INAMUR RAB SIDDIQI

BY

ATTORNEY

INVENTOR
INAMUR RAB SIDDIQI

BY

ATTORNEY

DUAL POINT ANNUNCIATOR SYSTEM

Filed June 26, 1967

INVENTOR
INAMUR RAB SIDDIQI

BY [signature]
ATTORNEY

INVENTOR
INAMUR RAB SIDDIQI

BY [signature]
ATTORNEY 3,550,122

DUAL POINT ANNUNCIATOR SYSTEM

Inamur Rab Siddiqi, 4914 N. Hall St., Dallas, Tex. 75201

Filed June 26, 1967, Ser. No. 648,764
Int. Cl. G08b 23/00
U.S. Cl. 340—415 11 Claims

ABSTRACT OF THE DISCLOSURE

There is disclosed in the specification and drawings a dual point annunciator system in which one of the field contacts associated with a variable is operated responsive to the variable becoming abnormal and a second field contact associated with the variable is only operated responsive to the variable becoming critically abnormal. There is also provided indicator means and control circuitry associated with the two field contacts such that the indicator provides one indication when the first field contact is operated, a second indication when neither of the field contacts are operated, a third indication when the second field contact is the first of a series to be operated and a fourth indication when the second field contact is operated subsequent to the first of the series. A split first-out mode of operation is also provided in which a first-out indication is provided only if the variable becomes critically abnormal subsequent to a different variable attaining a desired condition, such as the speed of a motor attaining a certain level.

Annunciator systems have become standard for utilization with complex machinery and processes. In such systems there is positioned at critical points a field contact which is operated upon a particular variable being monitored becoming abnormal. When the field contact is operated it actuates an alarm unit which is normally a visual alarm light unit indicating that the associated variable has become abnormal. It is also common to actuate an audible alarm for purpose of calling the abnormal condition to the operator's attention and to provide an acknowledge switch which changes the alarm indications when operated in order that the operator can readily ascertain which variables become abnormal prior to the operation of the acknowledge switch and those which become abnormal subsequent to the operation of the acknowledge switch. Such systems often times indicate the first variable of a series to become abnormal or the sequence in which variables become abnormal.

There is provided by the present invention a dual point annunciator system in which two field contacts are associated with at least certain of the variables being monitored by the system. The indicating means associated with each of the variables includes two indicating elements, one of which is primarily associated with one of the field contacts and the other which is primarily associated with the other field contact. One of the indicating elements is capable of providing three indications while the other of the indicating elements is capable of providing two indications. Since one of the indications provided by the two indicating elements is the same, the indicating means in combination provides four different indications. The field contact associated with the indicator element providing three indications is actuated when the associated variable first becomes abnormal and before the variable becomes critically abnormal. The second field contact is actuated only when the variable becomes critically abnormal, and suitably, operation of the second field contact is effective to shut down the system.

The first indicating element provides one indication, suitably a steady light of a green color, when the variable is normal. Upon the variable becoming sufficiently abnormal to actuate the first field contact, the indication of the first indicating is changed to provide the second of the first indicating element is changed to provide the second indication, suitably a flashing green light. Also, upon sound to draw the operator's attention to the presence of an abnormal condition. Upon acknowledgement, the horn is turned off but the visual indication remains. In the event the variable should return to normal prior to becoming critically abnormal, the first indicating element will return to its first indication.

Upon operation of the second field contact, the second indicating element is actuated to produce a first indication if the field contact is the first of the series to be operated, suitably a red light, and the first indicating element is actuated to produce the third indication, suitably one in which the green lamp is de-energized. If the second field contact when actuated is not the first of the series to become actuated, the second indicating element is operated to produce its second indication, the second indication of the second indicating element suitably being one in which the red lamp is not energized.

Many of the variables associated with a machine or process will normally provide an abnormal indication during the start-up period. Accordingly, there is provided a split first-out operation capability in which prior to a particular variable attaining a level indicating that the machine or process being monitored is in operation, the split first-out will not operate the second indicating element to provide the first-out indication when the second field contact is operated. However, once the system has attained its normal operating level upon start-up, the split first-out points will operate in the normal manner.

Many objects and advantages of the invention will become readily apparent to those skilled in the art, as a detailed description of a preferred embodiment of the invention unfolds when taken in conjunction with the appended drawings in which.

Figure 1:
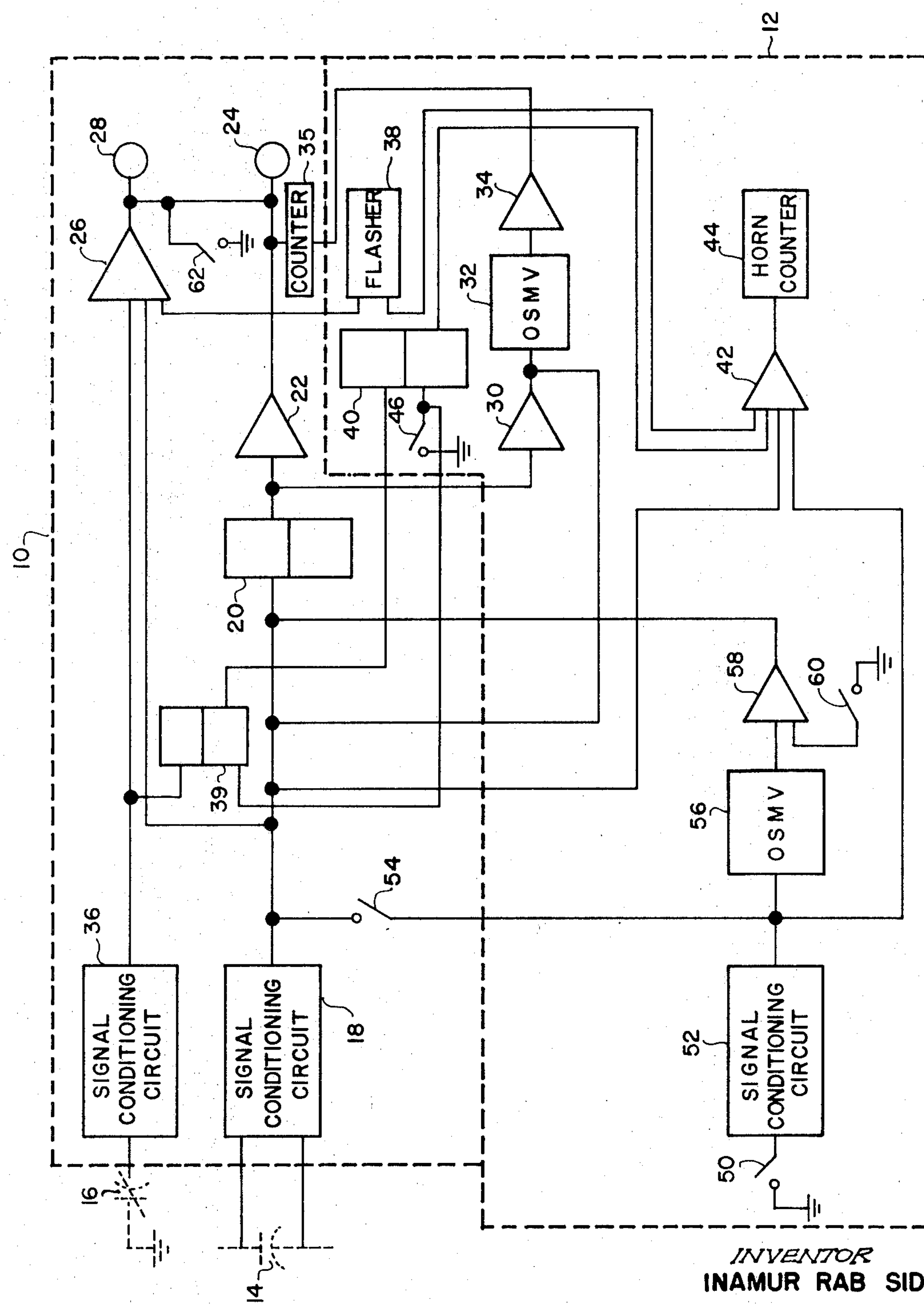
FIG. 1 is a block diagram of the circuitry associated with one variable.

In accordance with the specific example of the preferred embodiment of the invention, a lamp module indicated generally by the reference character 10 and to be described in detail with reference to FIG. 2 of the drawings, is associated with each variable to be monitored by the annunciator system. There is also provided a control module, designated generally by the reference character 12, and which is commonly connected to each of the lamp modules 10. The control module will be described in detail with reference to FIG. 3 of the drawings.

A block diagram of the annunciator system in accordance with the preferred embodiment of the invention is shown in FIG. 1 of the drawings. The system is one wherein dual field contacts are provided with each variable to be monitored. One of the field contacts is actuated at the time a variable becomes abnormal but not critical. The second field contact is operated at such time as the variable being monitored becomes critical and upon operation of this field contact the process is shut out. Accordingly, in FIG. 1 of the drawings there is shown a first field contact 14 which is responsive to the condition of the variable being monitored and a second field contact 16 which is also responsive to the condition of the variable being monitored. In the particular system described herein, the first field contact 14 is described as the series point as it is responsive to the variable becoming critical and is connected such that opening of the normally-closed contact 14 will result in shut-down of the system. The second field contact 16 is referred to as the dual point. In accordance with the preferred embodiment of the invention, the dual point is a normally-closed field contact which opens responsive to the associated variable becoming abnormal and which may open prior to the time the variable becomes so abnormal to be critical.

The field contact 14 is connected through a signal conditioning circuit 18 to the input of a bistable element 20. Opening of the series point 14 causes the signal conditioning circuit 18 to apply a signal to the bistable element 20, causing the bistable element 20 to switch from one state to its other state. The output of the bistable element 20 is connected through an amplifier 22 which functions as a gate to cause the red lamp 24 to become energized. Lighting of the red lamp 24 indicates that the series contact 14 is associated with the first of a series of variables to become critically abnormal. The output of the signal conditioning circuit 18 is also applied to an amplifier 26 which functions as a gate to cause the green lamp 28, which is normally energized, to be turned off. It will be noted that when the variable is normal that the green lamp will be on the red lamp off, establishing one indication of the indicator means and that a second indication is obtained when the green lamp is off and the red lamp is on.

The output of the bistable element 20 is also applied through an amplifier 30 to a one shot multivibrator 32. When the bistable element 20 switches state, a signal is applied to the one shot multivibrator which produces a pulse that is applied through an amplifier 34 to a counter 35, each of the variables having a series field contact associated therewith, suitably also having a respective individual counter such that the counters indicate the number of times a particular variable has become critically abnormal.

The dual point 16 is also connected to a signal conditioning circuit 36. The output of the signal conditioning circuit 36 is applied to the input of the amplifier gate 26 along with an output of a flasher unit 38. When the series contact 14 associated with the variable is in its normal condition but the dual point is in its abnormal condition, the green lamp 28 will flash on and off with the red lamp 24 remaining off, providing a third indication indicating that the particular variable has become abnormal but not critically so.

The output of the signal conditioning circuit 36 is also applied to an additional bistable element 39, causing the bistable element 39 to switch states. The output produced when the bistable element 39 switches state is supplied to the input of bistable element 40, causing the bistable element 40 to switch states. When the bistable element 40 switches states, a signal is applied to an amplifier gate 42 which causes horn circuit 44 to be energized. It will be noted that the output of the flasher circuit 38 is also applied to the amplifier gate 42 such that the horn will be sounded in a pulsating manner.

An acknowledgement switch 46 is connected to the other input of the bistable elements 40 and 39 such that operation of the acknowledgement switch will cause the bistable elements 40 and 39 to return to their initial states. Upon this occurrence, the input signal be will removed from the amplifier gate 42, causing the horn to be silenced. It will be noted that once the horn is operated, it will remain operated until acknowledged, but that if the variable being monitored should return to normal, the signal provided by the signal conditioning circuit 36 will be removed and the green lamp will return to its normal steady state. It will also be noted that in the particular example shown the output of the signal conditioning circuit 18 is also applied to the input of the amplifier gate 42 such that when the series contact 14 is in its abnormal condition, the horn circuit will be de-energized.

In accordance with the particular embodiment of the invention disclosed herein, the system is adapted for use with a printing press line and the series points are connected in series with the motor such that when one of the series points become abnormal, it will result in shut-down of the motor. There is connected to the motor a speed switch 50 which is closed at speeds above the desired level and open at speeds below the desired level. The output of the signal conditioning circuit 52 associated with the speed switch is applied to the amplifier gate 42 such that the horn circuit 44 can be energized only when the speed of the motor is above the desired level.

The output of the signal conditioning circuit 52 is also applied through a switch 54 to the input of the bistable element 20. The switch 54 is only closed on those modules in which a split first-out operation is desired. When the switch 54 is closed, the output of signal conditioning circuit 52 will prevent the output of signal conditioning circuit 18 being applied to the bistable element 20, and opening of switch 14 will not effect operation of the associated lamp module.

By split first-out operation is meant that first-out indication will be obtained only if the motor is operating above the desired speed. However, modules in which the switch 54 is not closed will operate on a first-out basis regardless of whether the speed is above or below the critical level. The output of the signal conditioning circuit 52 is also applied to a one shot multivibrator 56 whose output is applied through an "OR" gate 58 to an input the bistable element 20. The reset switch 60 is also connected through the "OR" gate 58 to the bistable element 20. When an output is applied from the "OR" gate to the bistable element 20, it will be returned to its initial state causing the red lamp to be turned off and all green lamps to be turned on.

The output of the signal conditioning circuit 52 is also applied to the input of the amplifier gate 42 such that when the speed of the motor is below operating speed operation of the amplifier 42 will be inhibited and the horn will not be actuated even though one of the dual contacts 16 should open. Similarly, the output of the signal conditioning circuit 18 is applied to the amplifier gate 42 for inhibiting operation of the amplifier gate 42 and preventing operation of the horn circuit 44 when one of the series contacts 14 is opened indicating a critically abnormal condition of one of the variables.

First-out operation of the series contact 14 is obtained by connection of the output of amplifier 30 to the input of the bistable element 20. Thus, when the first of the series contacts opens the bistable element 20 associated with the particular contact will be operated causing the amplifier 30 to apply a signal to the input of the bistable element 20 of all of the lamp modules and preventing additional signals being applied to any one of the bistable elements 20 from their associated conditioning circuits 18. As the additional ones of the series contacts open, indicating that their associated variable has become critically abnormal, a signal will be applied from the signal conditioning circuit to cause the green lamp 28 to become de-energized. The fourth indication provided by the indicator means is thus when both the green and the red lamps are de-energized, indicating that the seires contact has opened but was not the first of the series to do so.

There is also shown in FIG. 1 of the drawings a test switch 62 which is connected at one terminal to ground with the other terminal being commonly connected to the red lamp 24 and to the green lamp 28. When the test switch 62 is closed, all of the red and green lamps will become energized in order that the operator can determine if any of the lamps have burned out or are not operating for other reasons.

It can therefore be seen that the indicator housing which suitably contains the green lamps and red lamps produces four different indications responsive to operation of the two condition responsive means or field contacts associated therewith. The first indication would be the normal one in which the green lamps would be lit. The second indication would be the green lamp flashing and the red lamp off, indicating that the associated variable was abnormal but not critically so. The third indication would be the green lamp off and the red lamp on indicating that the variable associated with the conditioning responsive means was the first of the series to become critically abnormal. The fourth would be when both the green and red lamps are deenergized, indicating that the variable has become critically abnormal but was not the first of the series to do so. A split first-out operation is also provided in which by closing a switch associated with a particular lamp module the module only indicates the first-out condition which occurs subsequent to the speed or some other variable exceeding a desired level. Indications provided by the system responsive to various conditions are set forth in tabular forming Table 1 below.

| Conditions | Green Light, G | Red light, R | Counter, C | Horn, H |
|---|---|---|---|---|
| 1. Initially all normal i.e. series contacts closed | All Gs on | All R off | Off | Off. |
| 1. 1st series contact open | 1st G off | 1st R on | Advance | Off. |
| 2. 2d series contact open | 2d G off | | No advance | Off. |
| 2. Split first-out operation: | | | | |
| 1. Speed above the whole system to act as first-out and follow the sequence as in 1 above. | Same as above | Same as above | Same as above | Off. |
| 2. Speed Below: | | | | |
| (1) All split first-out points will not have first-out operation. | Off if series contact open. | None of split, 1st out section R light will be on. | No advance | Off. |
| (2) Permanent first-out points will act as first-out | 1st G off<br>2d G off | 1st R on<br>2d R off | Advance when R on. | Off. |
| 3. Dual Station Operation: | | | | |
| 1. Series contact open, dual contacts open or closed | Off | 1st R on 2d R off | Advance when R on. | Off. |
| 2. Series contact closed, dual contacts open | Flashing | Off | No advance | On if speed switch closed. |
| 3. Series contacts closed, dual contacts closed | On steady | Off | No advance | Off. |
| 4. Sounder Operation: | | | | |
| 1. Speed above, and dual point contacts open and all series contact closed. | Flashing | Off | No advance | On. |
| 2. Speed below, or dual point contacts closed again, or series contact open, or ack. switch closed momentarily. | Off/on | On if first of series | Advance when R on. | Off. |
| 5. Test operation | All G on | All R on | No advance | Off. |
| 6. Reset operation | On | Off | No advance | Off. |

Figure 2:
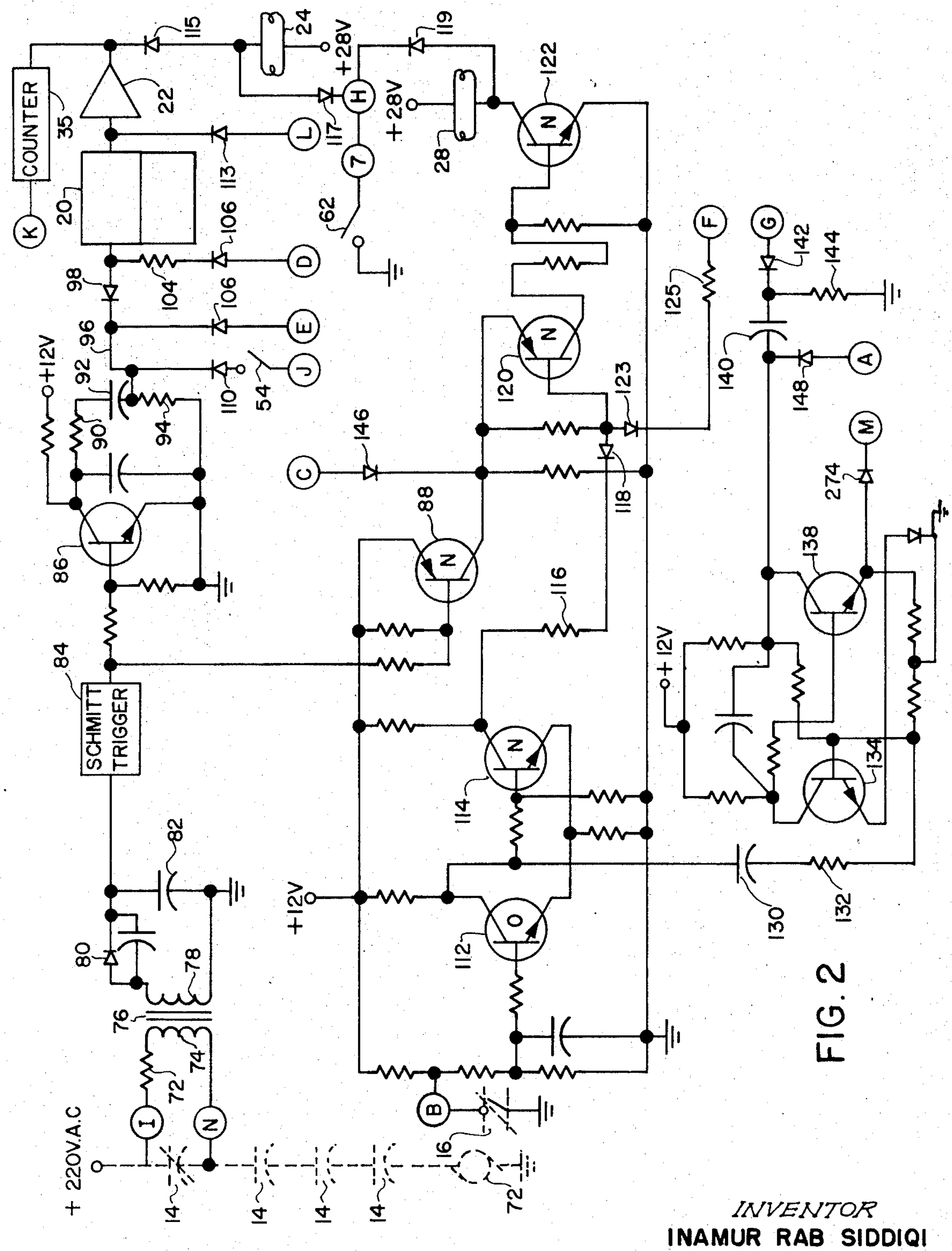
FIG. 2 is a schematic diagram of a lamp module in accordance with the preferred embodiment of the invention.
Figure 3:
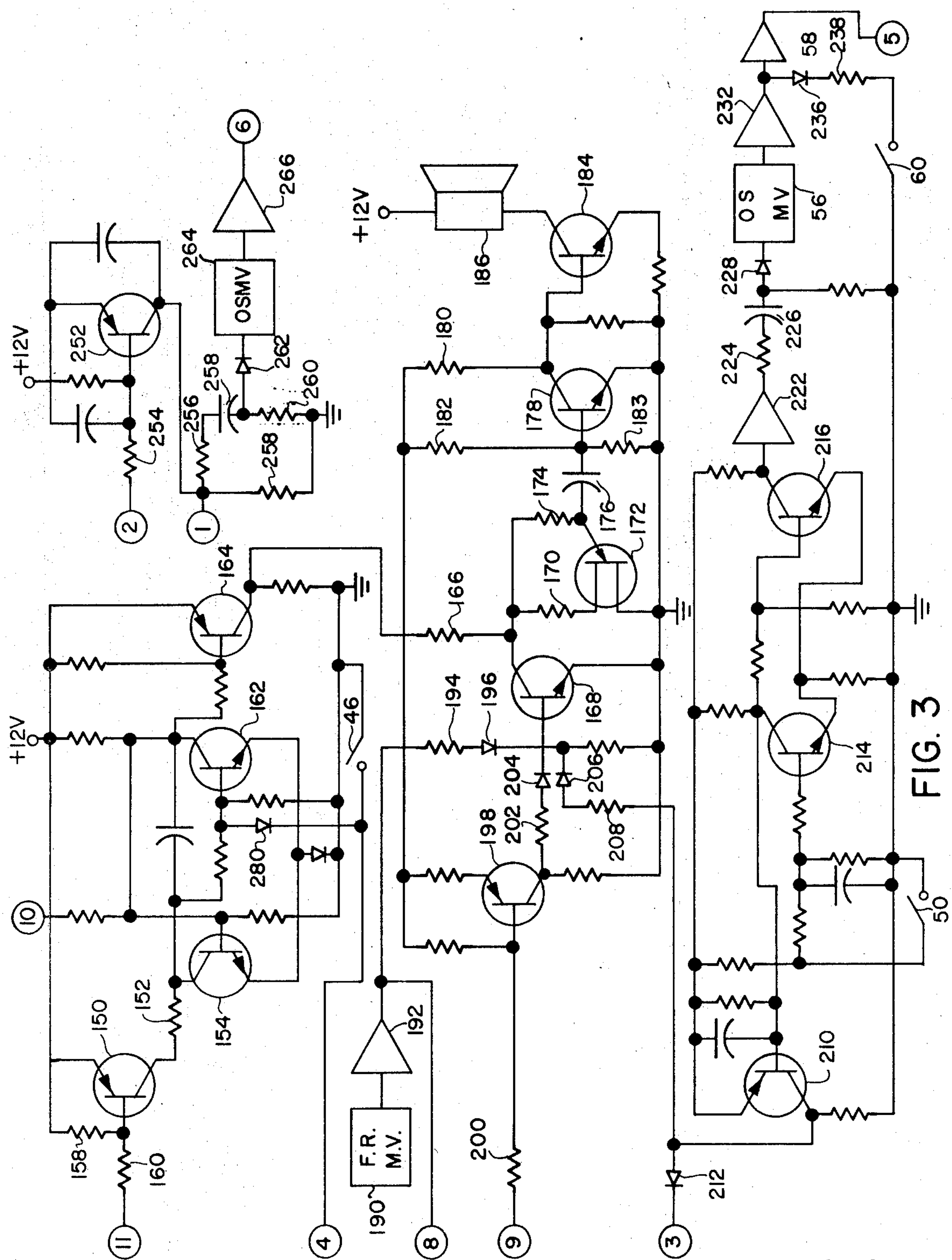
FIG. 3 is a schematic diagram of a control module in accordance with the present invention.
Figure 4:
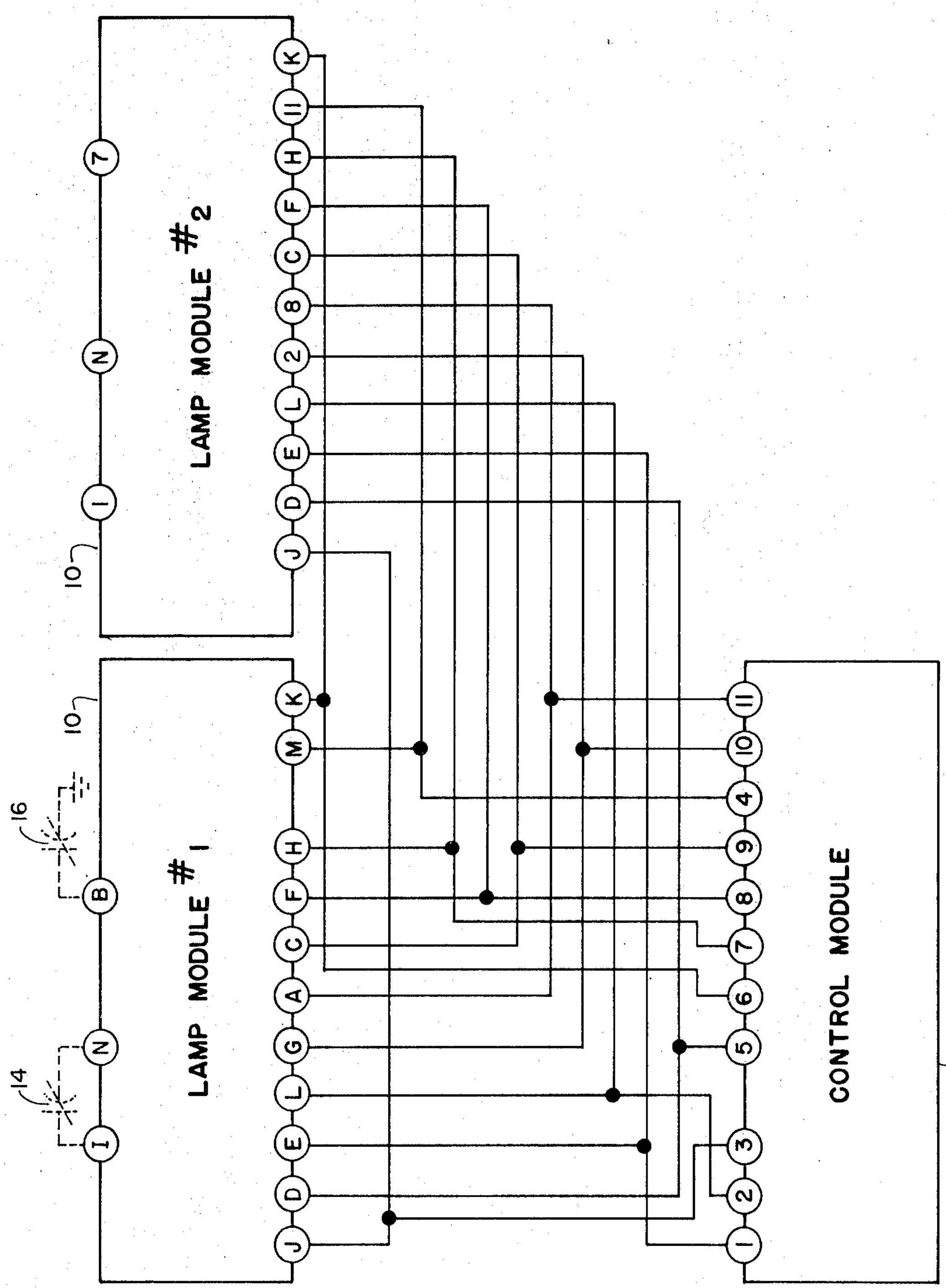
FIG. 4 is a wiring diagram illustrating the interconnections between the control module and the lamp module.

The circuitry associated with the preferred example of the invention is shown in greater detail in FIGS. 2, 3 and 4 of the drawings wherein there is shown in FIG. 2 the circuitry associated with each individual condition responsive element and referred to as being a lamp module 10. There is shown in FIGS. 3 of the drawings the control circuit 12 which is commonly connected to all of the lamp modules and there is shown in FIG. 4 the interconnections between the various lamp modules 10 and the control module 12.

Ae mentioned previously, there is suitably associated with each of the variables a series contact 14 which is open responsive to the abnormality of the variable becoming critical. Suitably, on opening of a series contact 14 the system will be shut down. In the specific example of the invention shown, the system is adapted for use with a printing press and the series contacts 14 are connected in series with a motor 72, as indicated in phantom, and a source of 220 volts A.C. current which drives the motor. One of the lamp modules, indicated generally by reference character 10, is associated with each series contact 14, although only one of the lamp modules 10 is shown in FIG. 2 of the drawings.

The lamp module includes two terminals N and I which are connected across the respective one of the series contacts 70. The terminal I is connected to terminal N through a resistor 72 and the primary winding 74 of a transformer 76. When the series contact 14 associated with the lamp module is closed, providing a short circuit across the series circuit comprising the resistor 72 and the primary winding 74, sufficient current will not flow through the primary winding 74 to induce a signal in the secondary winding 78. Upon the associated variable becoming critically abnormal the contact 14 will open and current will flow through the primary winding 74 inducing an output voltage in the secondary winding 78. The resistor 72 limits the amount of current flowing through the primary winding when the associated contact 14 is open and also prevents the current flow when the associated contact is closed. It will be appreciated that the resistance of the resistor 72 must be chosen in view of the number of series contacts being monitored to insure that such time as all of the series contacts have opened sufficient current will flow through the primary windings of the various lamp modules to induce the necessary signal in the secondary windings. In some cases a relay instead of a motor is connected in series with series contacts 14. The value of the resistor 72 must be chosen so that the impedance is high enough to insure the de-energization of the relay when one of the series contacts opens.

The signal induced in the secondary winding responsive to the associated variable becoming critically abnormal is rectified and filtered by rectifier 80 and capacitor 82. The rectified and filtered signal is applied to the input of a Schmidt trigger circuit 84 which is of conventional design and accordingly not shown schematically.

The output of the Schmidt trigger circuit 84 is applied to the input of an amplifier comprising NPN transistor 86 and its associated biasing resistors. The output of the Schmidt trigger circuit is also applied to the input of an amplifier comprising PNP transistor 88 and its associated biasing resistors. Connected across the output of the amplifier comprising NPN transistor 86 is a series connected circuit comprising of resistor 90, capacitor 92 and resistor 94.

When the transistor 86 is turned on responsive to an output from the Schmidt trigger 84, the potential at its collector will drop. The change in potential is differentiated by the capacitor 92 to produce a negative going pulse on line 96. The negative going pulse is applied through isolation diode 98 to the input of the flip-flop circuit 20. The negative going pulse is also applied through isolation diode 102 to terminal E and through resistor 104 and isolation diode 106 to terminal D. Similarly, if switch 54 is closed, the negative going pulse will be applied through diode 110 to terminal J.

The signals applied to terminals E, D and J will not effect operation of the system, however, the signal applied to the input of flip-flop 20 will cause the flip-flop to change from its one to its other state resulting in an output becoming less negative.

The output of the flip-flop circuit 20 is connected through the diode 113 to terminal L. The output of the flip-flop 20 is also applied to the input of the gating amplifier 22 causing the output of the amplifier 22 to be at or near ground potential. The output of the amplifier 22 is connected to one side of counter 35, the other side of the counter 35 being connected to terminal K. If the potential is present at terminal K when amplifier 22 is turned on, the count in the counter would advance one. The output of amplifier 22 is also connected through diode 115 and the red lamp 24 to a source of potential, suitably a +28 volts. The juncture between diode 115 and the lamp 24 is connected through diode 117 to the test switch 62. The test switch 62 is also connected through diode 119 to the green lamp 28, which is also connected to a source of potential, suitably +28 volts.

It can therefore be seen that when the output of the amplifier 22 drops to ground potential the counter will advance one count and the red lamp will become lit. The diode 119 prevents the green lamp becoming energized, however. When the test switch 62 is closed current will flow through both the red lamps 24 and the green lamps 28 for purpose of testing to see whether these lamps can be energized. However, the isolation diode 115 prevents operation of the counter 35 when the test switch 62 is operated.

The dual contact associated with the variable is, in this specific example, the normally closed type which opens when the variable becomes abnormal, and is indicated by the reference character 16. It will be noted that the switch 16 can open, indicating an abnormal condition, prior to the time that the degree of abnormality becomes critical. The switch 16 is connected to terminal B of the associated lamp module.

Terminal B of the lamp module is connected in the input of a Schmidt trigger circuit comprising NPN transistors 112 and 114 with the associated biasing resistors. When the field contact 16 is closed terminal B will be shorted to ground causing transistor 112 to be biased off. Upon this occurrence, transistor 114 will be biased on resulting in a decrease in the potential appearing at the collector of transistor 114. The collector of transistor 114 is connected through resistor 116 and diode 118 to the base of PNP transistor 120. When the potential at the collector of transistor 114 drops, the diode 118 will become biased in a forward direction permitting the transistor 120 to be biased on. When transistor 120 conducts, gate current will be applied to NPN transistor 122, permitting current to flow through the green lamps 28 when the variable is normal.

It will be noted that transistors 120 and 122 can be in the conductive state only if transistor 88 is conductive. Transistor 88 is conductive only if the Schmidt trigger circuit 84 is not operated responsive to opening of the associated series contact 14. Accordingly, if field contact 14 is open, transistor 88 will be biased to a non-conductive state and it will not be possible for the green lamp 28 to be energized even if the field contact 16 should close. It will also be noted at this point that the collector of transistor 88 is connected through isolation diode 146 to terminal C and that the base of transistor 120 is connected through isolation diode 123 and a resistor 125 to terminal F.

If the field contact 16 is open, indicating that the associated variable is abnormal, transistor 114 will be biased off and its collector will be sufficiently positive that current for transistor 120 will not flow through transistor 114. The control module 12 will provide an intermittent ground at terminal F to cause the green lamp 28 to flash. The flashing green lamp indicates that the variable is abnormal but not critically abnormal.

If after the time the variable becomes abnormal but before the variable becomes critically abnormal, the variable should return to normal, the associated field contact 16 will close, causing transistor 112 to be biased into a non-conductive state. Transistor 114 will then be biased conductively, causing transistor 120 to conduct. Upon conduction of transistor 120, base current is applied to transistor 122, causing it to be steadily biased on and resulting in the green lamps being energized continuously rather than intermittently, indicating that the variable is normal.

The collector of transistor 112 is also connected through capacitor 130 and resistor 132 to the base of PNP transistor 134, which is a portion of flip-flop 39. The flip-flop 39 also includes PNP transistor 138. Transistors 134 and 138 are biased in conventional fashion such that when one of the transistors 134 and 138 is conductive, the other will be maintained non-conductive. The output of flip-flop 39 is taken from the collector of transistor 138 and is applied through capacitor 140 and isolation diode 142 to terminal G with the juncture between the capacitor 140 and the diode 142 being connected to ground through resistor 144. The collector of transistor 138 is also connected through diode 274 to terminal A. The base of transistor 138 is connected through diode 274 to terminal M. The function of flip-flop circuit 39 will be described later.

It can be seen from the foregoing that when the series contact 14 is closed and the dual contact 16 is close, transistor 122 will be biased on causing the green lamps to be lit, indicating that the variable is normal. If the variable becomes abnormal but not critically so, contact 16 will open, biasing transistor 120 off which results in transistor 122 also being biased off. The green lamp will accordingly be turned off. However, a signal will be applied to terminal F from the control circuit causing the transistor 120 and 122 to periodically be biased on causing the green lamp to produce flashing indication. However, if the variable should return to its normal state transistors 120 and 122 will be continuously biased on causing the green lamps to return to their normal constantly energized condition. On the other hand, if the series contact 14 should open the signal applied from the Schmidt trigger 84 will cause transistor 88 to be biased off resulting in transistors 120 and 122 also being biased off maintaining the green lamps continuously off.

It will be noted that terminal C is connected to the collector of transistor 88 through a diode 146 poled to prevent flow of current toward terminal C. It will also be noted that when transistor 138 of the flip-flop circuit 39 is conductive the potential at its collector will drop to a sufficiently low level to permit diode 148 which connects to terminal A to become forward biased and that the change of potential as transistor 138 changes from its non-conductive to its conductive state will be differentiated by the capacitor 140 and applied as a negative going pulse through diode 142 to terminal G.

The control circuitry is shown in greater detail in FIG. 3 of the drawings and can be seen to comprise a PNP transistor 150 whose emitter is connected to a source of biasing potential, suitably +12 volts. The collector of transistor 150 is connected through resistor 152 to the collector of NPN transistor 154 which is a portion of flip-flop circuit 40. When transistor 150 is conductive B+ potential will be applied to the collector of transistor 154, permitting operation of the flip-flop circuit 40. The base of transistor 150 is connected through resistor 158 to supply voltage and through resistor 160 to terminal 11.

The second NPN transistor 162 of the flip-flop circuit 40 is connected through appropriate biasing resistors to an amplifier comprising PNP transistor 164. The collector of transistor 164 is connected through resistor 166 to the collector of NPN transistor 168 such that supply voltage will be applied to transistor 168 when transistor 164 is conducting. The juncture between resistor 166 and the collector 168 is applied through resistor 170 to one base of the unijunction transistor 172, the other base thereof being connected to ground. The emitter of the unijunction transistor 172 is connected through resistor 174 to the juncture of resistor 166 and the collector of transistor 168. The emitter of unijunction transistor 172 is connected through capacitor 176 to the base of transistor 178 whose emitter is connected to ground and collector is connected through resistor 180 to positive 12 volts. The base of transistor 178 is similarly connected through resistor 182 to +12 volts and through resistor 183 to ground. Transistor 178 is therefore connected as an amplifier which is normally conducting. The collector of transistor 178 is connected to the base of transistor 184 which is biased to be conductive when transistor 178 is biased off. When transistor 184 is conductive the horn 186 will be energized.

The base of transistor 168 is driven from three separate sources. There is provided in the control circuitry a free running multivibrator 190 whose output is connected through an amplifier 192, resistor 194 and isolating diode 196 to the base of transistor 168. The output of amplifier 192 is also connected to terminal 8 of the control circuitry. There is also provided a PNP transistor 198 which is connected as an amplifier with the base of transistor 198 being connected through resistor 200 to terminal 9 such that transistor 198 will be conductive when terminal 9 is connected to ground potential. The collector of transistor 198 is connected through resistor 202 and isolating diode 204 to the base of transistor 168. The base of transistor 168 is also connected through isolating diode 206 and a resistor 208 to the collector of PNP transistor 210.

The collector of transistor 210 is also connected through an isolating diode 212 to terminal 3 of the control circuitry. The base of transistor 210 is connected to the collector of an NPN transistor 214 which is connected along with transistor 216 to define a Schmidt trigger circuit which comprises a part of the signal conditioning circuit 52. The base of transistor 214 is connected through the appropriate biasing resistors and capacitors and through speed switch 50 to ground such that transistor 214 will be conductive when speed switch 50 is open and be rendered non-conductive when speed switch 50 closes.

Transistor 210 will be conductive and transistor 216 non-conductive when transistor 214 is conductive. Transistor 198 will be conductive when transistor 88 is biased off. Accordingly, the horn cannot sound if switch 50 is open (indicating the motor has not attained operating speed) or if transistor 88 is off (indicating operation of one of the series contacts 14). The collector of transistor 216 is connected through an amplifier 222 whose output is connected through resistor 224, capacitor 226 and diode 228 to the one shot multivibrator 56. The output of the one shot multivibrator circuit 56 is connected through an amplifier 232 and an amplifier 58 to terminal 5 of the control circuitry. The juncture between the amplifiers 232 and 58 is connected through an isolating diode 236, a resistor 238 and reset switch 60 to ground.

The control circuitry also includes the test switch 62 (shown in FIG. 2) connected at one terminal to ground with the other terminal thereof being connected through terminal 7 to terminal H of the control circuitry. The acknowledge switch 46 is similarly connected at one terminal to ground with the other being connected to terminal 4 and through diode 280 to the base of transistor 162.

There is also provided an amplifier comprising PNP transistor 252 whose base is connected through resistor 254 to terminal 2. The amplifier comprising transistor 252 also includes the necessary resistors and capacitors to bias the transistor 252 such that it will be conductive when terminal 2 is at or near ground potential. The collector of PNP transistor 252 is connected to terminal 1 of the control circuitry. The collector of transistor 252 is also connected through a resistor 256, capacitor 258 and resistor 260 to ground such that when transistor 252 changes from the conductive to the nonconductive state the change in potential is differentiated by capacitor 258 to produce a negative going pulse which is applied through diode 262 to the one shot multivibrator 264. The output of the one shot multivibrator 264 is connected through an amplifier 266 to terminal G of the control circuitry.

The connections between the lamp module 10 and the control module 12 is shown in FIG. 4. Thus, terminals I and N of each lamp module 10 is connected across the series contact 14 associated therewith. Similarly, terminal B of each lamp module is connected through its associated dual contact 16 to ground. Terminal 1 of the control module 12 is commonly connected to terminal E of each of the lamp modules. Similarly, terminal 2 of the control module is commonly connected to terminal L of each of the control modules. Terminal 3 of the control module is commonly connected to each of the terminals J of the lamp modules, terminal 5 of the control module is commonly connected to terminal D of each of the lamp modules, terminal 6 of the control module is commonly connected to each of the terminals K of the lamp modules, terminal 7 of the control module is commonly connected to each terminal H, terminal 8 of the control module is commonly connected to terminal F of each of the lamp modules, terminal 9 of the control module is commonly connected to terminal C of each of the lamp modules, terminal 4 of the control module is commonly connected to terminal M of each of the lamp modules, terminal 10 of the control module is commonly connected to terminal G of each of the lamp modules, and terminal 11 of the control module is commonly connected to terminal A of each of the lamp modules. The number of lamp modules to be controlled by the single control module can be as needed, although only two are shown.

The NPN transistor 112 of the lamp module connected to the point associated with the variable which first becomes abnormal though not necessarily critically abnormal, will become biased to a conductive state. On this occurrence, the collector of transistor 112 will become less positive biasing NPN transistor 114 to the nonconductive state. It will be seen that the transistors 112 and 114 define a Schmidt trigger circuit which is a portion of the signal conditioning circuit 36. Also, as transistor 112 becomes conductive causing the potential of the collector to become less positive, the change of potential is differentiated by the capacitor 130 and applied to the base of transistor 134 which is a portion of the flip-flop circuit 39. Transistor 134 will accordingly be biased off causing transistor 138 to be biased to a conductive state.

The collector of transistor 138 will accordingly become more negative. The change in potential is differentiated by capacitor 140 and applied through terminal G and terminal 10 to the base of transistor 154 of flip-flop 40 of the control circuitry. Transistor 154 will be biased to a nonconductive state resulting in transistor 162 of the flip-flop 40 becoming conductive. When transistor 162 becomes conductive transistor 164 will also be biased into a conductive state applying B+ potential to the collector of transistor 168.

If transistor 168 is off, capacitor 176 will be charged through a path comprising resistors 166, 174 and 183 until the capacitor 176 is charged to the breakover voltage of the unijunction transistor 172. When unijunction transistor 172 switches, the base of transistor 178 will be effectively connected to ground causing transistor 178 to be rendered nonconductive. When transistor 178 is rendered nonconductive base current will be applied to transistor 184 rendering it conductive and causing the horn to blow. The output of the free running multivibrator 190 which comprises the flasher 38 is applied to the base of transistor 168 such that it is alternately rendered conductive and nonconductive. When the transistor 168 is conductive, it will short across the unijunction transistor 172 causing it to return to its high impedance state and remain in its high impedance state until the transistor 168 has been biased off and the capacitor 176 is again charged to the breakover voltage of the unijuncture transistor. The horn 186 will therefore be caused to sound intermittently provided, as described previously, the series contact 14 is closed and the speed switch 50 is closed.

The output of the free running multivibrator 190 is also applied through amplifier 192 and terminal 8 of the control module to terminal F of the lamp module. As the output of the free running multivibrator goes positive, transistor 120 of the lamp modules will become biased off but will be biased on when the output of the free running multivibrator is negative. As the conductive state of transistor 120 changes at the frequency of the free running multivibrator, the conductive state of transistor 122 will similarly change causing the green lamps 28 to flash on and off at the frequency of the free running multivibrator 190.

When the acknowledge switch 46 is operated, ground will be applied to the base of transistor 162 through isolation diode 280 causing transistor 162 of the control circuitry to be biased on. When transistor 162 is biased on, transistor 164 will be biased off resulting in disabling of the horn 186 as voltage will no longer be available for charging of capacitor 176. Ground is also applied through a terminal 4 of the control module and terminal M of each of the lamp modules and diode 274 of each of the lamp modules to the emitter of the NPN transistor 138 which comprises a port of the flip-flop circuit 39 resetting the flip-flop 39 to its initial state. When flip-flop 39 is reset to its initial state it will no longer supply ground for transistor 150 of the control circuitry and most parts of the circuit will return to their initial, normal state. The green lamps will continue to flash intermittently until the variable returns to its normal condition or becomes critically abnormal but the horn will not be energized.

When the condition of the variable associated with the lamp module becomes critically abnormal, the series contact 14 will open causing power to be removed from the motor 72 shutting down the system. The output of the Schmidt trigger 84 will be applied to cause the PNP transistor 88 to become biased nonconductively resulting in transistor 122 also being biased to a nonconductive state and causing the green lamps 28 to become de-energized. If the variable is the first of a series to become abnormal the flip-flop will switch states causing the red lamp to be energized when gating amplifier 22 supplied a ground responsive to the output of flip-flop 20 dropping to near ground potential. The output of flip-flop 20 is also connected through terminals L and 2 to the base of transistor 252 of the control module.

When the flip-flop changes states causing its output to drop to or near ground potential, transistor 252 of the control module will be biased on causing a positive potential to be applied to terminal E of all the lamp modules from the collector of transistor 252 through terminal 1 of the control module. So long as the potential is present, a negative going pulse will not be applied to flip-flop 20 of the lamp modules, responsive to opening of a contact 14, although the associated green lamps will be de-energized as the result of the signal applied from the Schmidt trigger 84 to a base of transistor 88. Therefore, only the lamp module associated with the first variable to become critically abnormal will provide the indication of an energized red lamp.

The change in potential at the collector of transistor 252 when the transistor changes from the nonconducting to the conductive state is differentiated by capacitor 258 and applied to the one shot multivibrator 264 as a positive going pulse which causes the multivibrator 264 to change states momentarily. The pulse produced at the output of the one shot multivibrator 264 is amplified by amplifier 266 and applied to terminal 6 of the control module. Terminal 6 of the control module is connected to terminal K of each of the lamp modules which are connected to a counter 35. If the amplifier gate 22 of the lamp module associated with the variable which first becomes critically abnormal is rendered conductive providing a ground for the red lamp 24 associated therewith, a pulse will be applied to the counter 35 causing the counter to advance one count. By providing individual counters with each of the lamp modules, it is possible to determine the frequency of which any particular variable has become critically abnormal. It will be particularly noted that each counter is only caused to advance one count when the variable associated therewith is the first of a series to become critically abnormal.

The indications provided when series contacts open will remain after all variables have returned to normal unless the system is reset. To reset the system, the reset switch 60 is closed momentarily. Upon operation of switch 60, a positive potential will be applied to the input of flip-flop 20 of all lamp modules, causing each of them to be reset. When flip-flop 20 is reset, each of the gating amplifiers 22 will be in a nonconductive state, such preventing energization of the associated red lamps 24. Transistor 252 will no longer be biased conductively and the positive potential will be removed from terminal E. The system will thus be in condition to indicate occurrence of abnormal conditions of the variable being monitored.

It will be noted that the system is reset automatically each time the switch 50 closes, indicating that the motor has attained normal operating speed. Upon closure of switch 50 transistor 214 is turned off and transistor 216 is biased on. The change in potential at the collector of transistor 216 inverted in amplifier 22 and differentiated by capacitor 226 to produce a pulse which is applied to the one shot multivibrator 56. The output of the one shot multivibrator causes amplifier 58 to apply a positive pulse to reset flip-flop 20. Assurance is thereby provided that indications obtained after running speed is attained are not residual ones remaining due to failure to manually reset the systems.

In many types of systems certain variables will provide critically abnormal indications until certain start-up conditions, such as the speed of a motor, have been met. For example, if the temperature of a bearing becomes critically high at any time it would be justification for shutting down the system. On the other hand, the pressure of the oil supplied to the bearing would be low at the time of starting the motor and would not be justification of shutdown of the system or for a first-out indication unless the pressure fell to a critically low level subsequent to the time that the motor operating speed was reached. It will be apparent that in such a system it would be necessary to provide circuitry (not shown) for shorting the series contact associated with the bearing oil pressure during start-up of the motor. Accordingly, there is provided by the present invention a split first-out operation in which at speeds above normal operating speed all series contacts act as first-out indicators and will shut down the system upon becoming critically abnormal, but certain split first-out lamp modules will not provide first-out indication at speeds below the desired speed. It will be appreciated that the split first-out operation does not affect operation of the dual points but only operation of the series points.

A split first-out operation is obtained by closing switch 54 of the lamp modules associated with those variables for which a split first-out operation is desired. As described previously, at speeds below the normal operating speed positive potential will be applied from transistor 210 of the control module through isolating diode 212, switch 54 and diode 110 to prevent diode 98 becoming forward biased. Accordingly, a negative going pulse will not be produced by the differentiating capacitor 92 when transistor 86 is biased to a conductive state and the red lamps 24 will not be energized by gating amplifier 22. At speeds above the normal operating speed, the positive potential applied through diode 110 will be removed and normal first-out indication will be obtained.

Although the invention has been described with reference to preferred embodiments thereof, many changes and modifications will be obvious to those skilled in the art. The foregoing description is therefore intended to be illustrative and not limiting of the invention defined in the appended claims.

What I claim is:

1. An annunciator system comprising:

an indicator means for each of an interrelated group of variables for indicating the condition of an associated variable having first and second degrees of abnormality;

first circuit means responsive to a normal condition of said first degree of abnormality of said variable for actuating said indicator means to provide a first indication thereof and responsive to an abnormal condition of said first degree of abnormality of said variable for actuating said indicator means to provide a second indication thereof;

second circuit means responsive to an abnormal condition of said second degree of abnormality of said variable for actuating said indicator means to provide a third indication thereof when said second means is the first of a series to respond to an abnormal condition of said second degree and to provide a fourth indication thereof when said second means is the second or subsequent one of a series to respond to an abnormal condition of said second degree, thereby providing a first out indication of the occurrences of said second degrees of abnormality.

2. The annunciator of claim 1, and in addition:

a signal conditioning circuit connected between at least one of said variables and its associated second circuit means for inhibiting operation of said associated second circuit means thereby preventing said third indication prior to a machine being monitored by said one of said variables reaching a preselected operating level.

3. The annunciator of claim 2 further including switch means in said signal conditioning circuit for making said signal conditioning circuit selectively operable.

4. An annunciator system as defined in claim 2 further including audible alarm means connected for actuation by said first circuit means responsive to an abnormal condition of said first degree of abnormality of said variable.

5. An annunciator system as defined in claim 4 including means responsive to said signal conditioning circuit for preventing actuation of said audible alarm means in response to actuation of said second circuit means providing said third indication.

6. An annunciator system as defined in claim 4 further including a manually operable acknowledge switch and circuit means responsive to operation of said acknowledge switch for deactuating said audible alarm means.

7. An annunciator system as defined in claim 2 wherein said second circuit means responsive to an abnormal condition of said second degree of abnormality comprises a normally closed field contact connected in series with at least one other normally closed field contact, the other normally closed field contact being responsive to an abnormal condition of a different variable than first mentioned normally closed field contact, a resistor and a primary winding of a transformer connected in series across said normally closed field contact whereby sufficient current will flow through said primary winding to induce an output signal in a secondary winding of said transformer responsive to opening of the normally closed contact connected across a series circuit comprising the resistor and primary winding of said transformer.

8. An annunciator system as defined in claim 2 wherein a normally open field contact is associated with each of said variables and wherein said second circuit means comprises a transformer having a primary winding and a secondary winding, a resistor and means connecting said primary winding and said resistor in series across said normally open field contact.

9. An annunciator system as defined in claim 2 wherein first and second field contacts are associated with each of said variables, operation of each of said first field contacts indicating that the variable associated with it is abnormal and operation of each of said second field contacts indicating that the degree of abnormality has increased from that at which said first field contact is operated, said first circuit means being responsive to operation of said first field contact and said second circuit means being responsive to operation of said second field contact.

10. An annunciator system as defined in claim 2 further including third circuit means responsive to a variable changing from an abnormal to a normal condition of said second degree of abnormality for changing the indication of said indicator means from said third or fourth indications to said first indication when said variable is normal.

11. The annunciator of claim 1 and in addition:

counter means connected to at least one of said second circuit means, and operable in response to each actuation of its associated indicator means providing said third indication, for advancing said counter means one count, thereby providing a running total of the number of said first out indications of said associated indicator means.

References Cited

UNITED STATES PATENTS

| | | | |
|---|---|---|---|
| 2,701,872 | 2/1955 | Marmorstone | 340—213.2 |
| 2,820,217 | 1/1958 | Sperry et al. | 340—213.2 |
| 3,128,456 | 4/1964 | Silliman et al. | 340—213.1 |
| 3,212,078 | 10/1965 | Shanahan | 340—213.1X |
| 3,218,621 | 11/1965 | Foster | 340—213.2 |
| 3,287,717 | 11/1966 | Kraus | 340—223X |
| 3,419,857 | 12/1968 | Martin | 340—324X |

DONALD J. YUSKO, Primary Examiner

D. L. TRAFTON, Assistant Examiner

U.S. Cl. X.R.

340—213.1, 213.2, 324